(12) United States Patent
Francisco et al.

(10) Patent No.: US 12,347,828 B2
(45) Date of Patent: *Jul. 1, 2025

(54) SOLID ELECTROLYTE MATERIAL AND SOLID-STATE BATTERY MADE THEREWITH

(71) Applicant: Solid Power Operating, Inc., Louisville, CO (US)

(72) Inventors: Brian E. Francisco, Arvada, CO (US); Benjamin A. Carlson, St. Paul, MN (US)

(73) Assignee: Solid Power Operating, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,347

(22) Filed: Jan. 17, 2024

(65) Prior Publication Data

US 2024/0283010 A1  Aug. 22, 2024

Related U.S. Application Data

(63) Continuation of application No. 17/210,119, filed on Mar. 23, 2021, now Pat. No. 11,916,193.

(60) Provisional application No. 63/088,233, filed on Oct. 6, 2020, provisional application No. 62/993,571, filed on Mar. 23, 2020.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| | | |
|---|---|---|
| 8,075,865 B2 | 12/2011 | Deiseroth et al. |
| 2017/0338512 A1* | 11/2017 | Nogami ............ H01M 10/0585 |
| 2019/0097262 A1 | 3/2019 | Chen et al. |
| 2019/0173127 A1 | 6/2019 | Jang et al. |
| 2019/0237801 A1 | 8/2019 | Kanno et al. |

(Continued)

FOREIGN PATENT DOCUMENTS

| | | |
|---|---|---|
| EP | 3239986 A1 | 11/2017 |
| EP | 3637442 A1 | 4/2020 |
| JP | 2016-207355 A | 12/2016 |

(Continued)

OTHER PUBLICATIONS

Zhou, L. et al., Solvent-Engineered Design of Argyrodite Li6PS5X (X=Cl, Br, I) Solid Electrolytes with High Ionic Conductivity, ACS Energy Letters, 4:265-270, 2019 (6 pages).

(Continued)

*Primary Examiner* — Eli S Mekhlin
(74) *Attorney, Agent, or Firm* — Polsinelli PC; Gregory P. Durbin

(57) ABSTRACT

A solid electrolyte material comprising Li, T, X and A wherein T is at least one of P, As, Si, Ge, Al, and B; X is $BH_4$; A is S, Se, or N. The solid electrolyte material may include glass ceramic and/or mixed crystalline phases, and exhibits high ionic conductivity and compatibility with high voltage cathodes and lithium metal anodes.

21 Claims, 11 Drawing Sheets

Electrochemical Cell

(56) References Cited

U.S. PATENT DOCUMENTS

2020/0227776 A1     7/2020     Jordy et al.

FOREIGN PATENT DOCUMENTS

| JP | 2018-039689 A | 3/2018 |
| WO | 2016/103894 A1 | 6/2016 |
| WO | 2018/038164 A1 | 3/2018 |
| WO | 2018183365 A1 | 10/2018 |
| WO | 2018/225526 A1 | 12/2018 |
| WO | 2019009228 A1 | 1/2019 |
| WO | 2019/057840 A1 | 3/2019 |

OTHER PUBLICATIONS

Sakuda, A. et al., Mechanochemically Prepared Li2S—P2S5—LiBH4 Solid Electrolytes with an Argyrodite Structure, ACS Omega, 3:5453-5458, 2018 (6 pages).

Adeli, P. et al., Boosting Solid-State Diffusivity and Conductivity in Lithium Superionic Argyrodites by Halide Substitution, Angewandte Chemie International Edition, 58:8681-8686, 2019 (6 pages).

International Searching Authority, International Search Report and Written Opinion, issued in connection with PCT/US2021/023726, mailed Jun. 10, 2021 (12 pages).

European Patent and Trademark Office, Extended European Search Report issued for EP Application No. 21776283.0, Mar. 5, 2024 (9 pages).

Jorgens, S. et al., $Ag_5PS_4Cl_2$ and $Ag_{15}(PS_4)_4Cl_3$—Crystal structures and their relation to $Ag_3PS_4$, Solid State Sciences, 9(2): 213-217, 2007.

Winkler, C., Germanium, Ge, A New Nonmetallic Element, Berichte der Deutschen Chemischen Gesellschaft, 19:210-211 (1886).

Yamauchi, A. et al., Preparation and ionic conductivities of (100-x) $(0.75Li_2S.0.25P_2S_5) \cdot xLiBH_4$ glass electrolytes, Journal of Power Sources, 244: 707-710, 2013.

\* cited by examiner

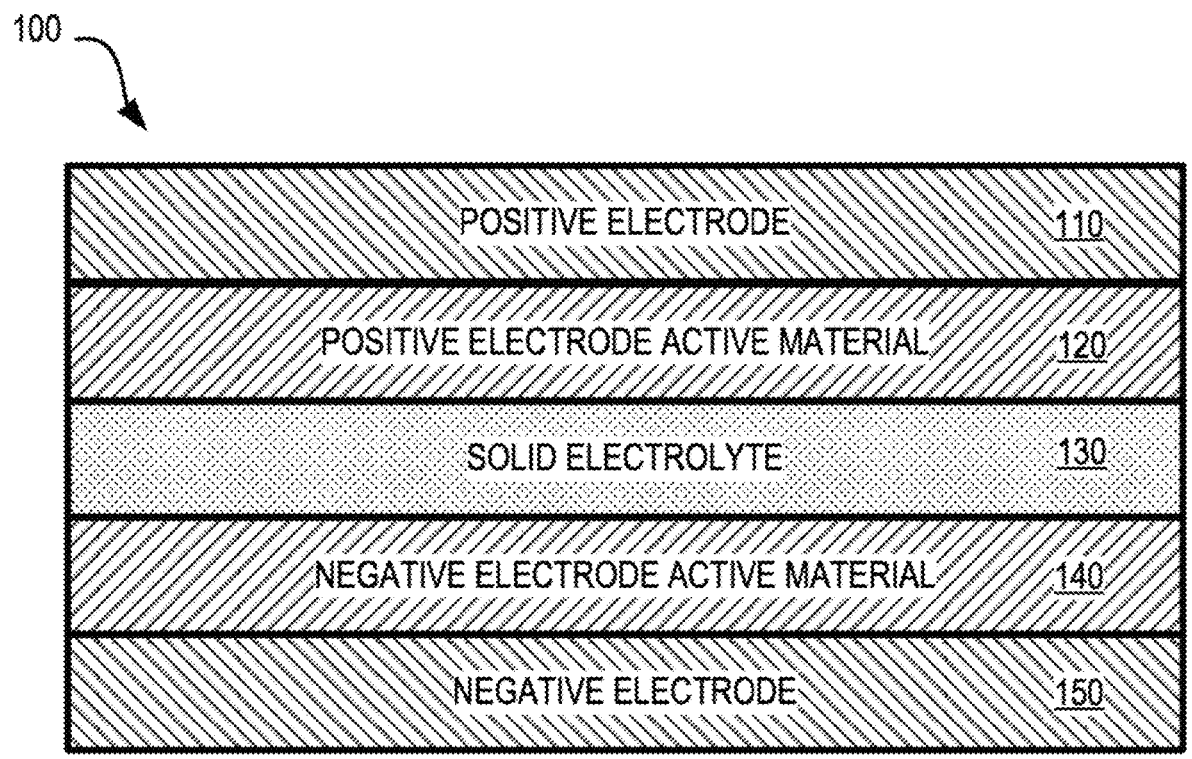
FIGURE 1 – Electrochemical Cell

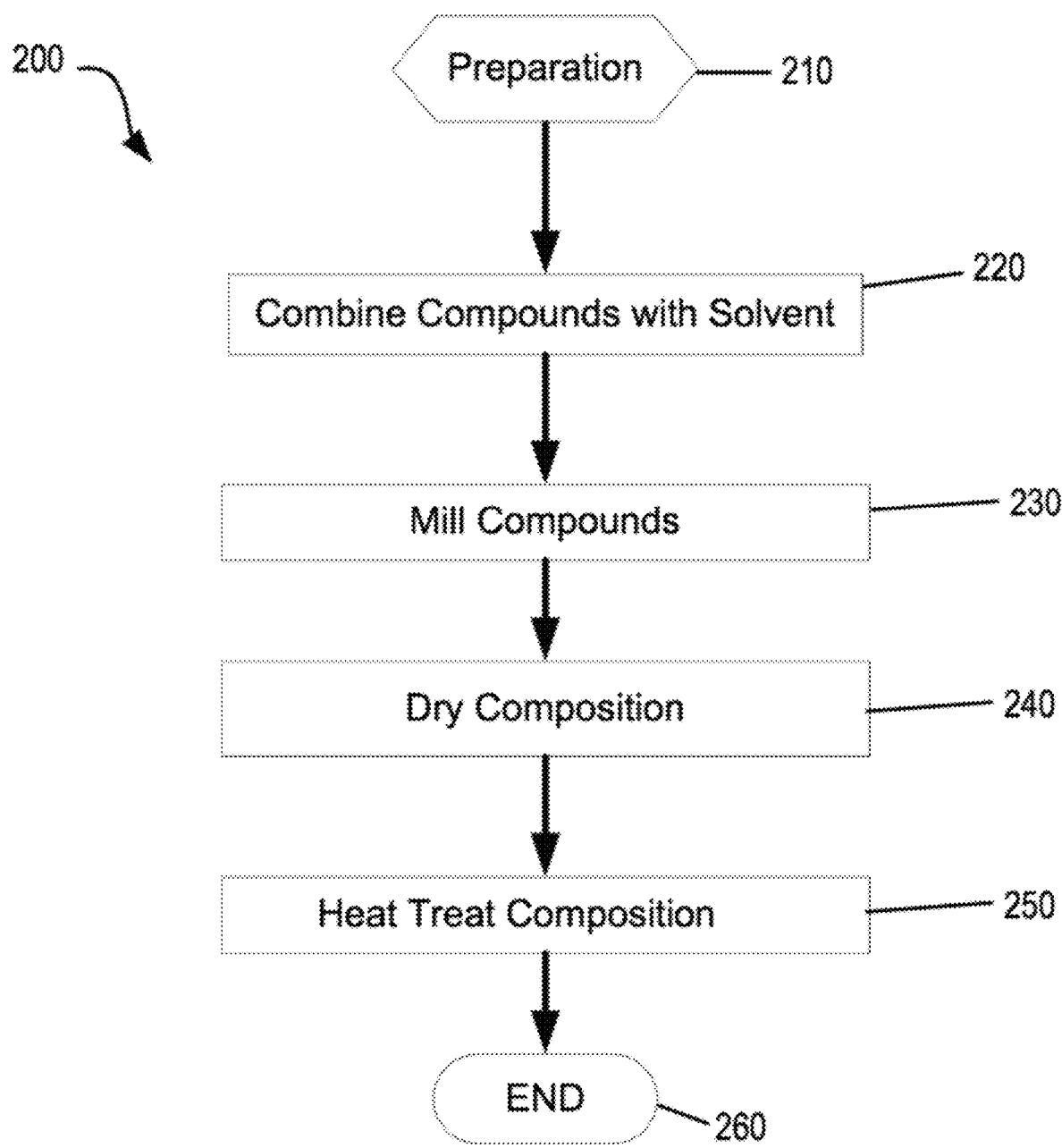
FIGURE 2 – Synthesis

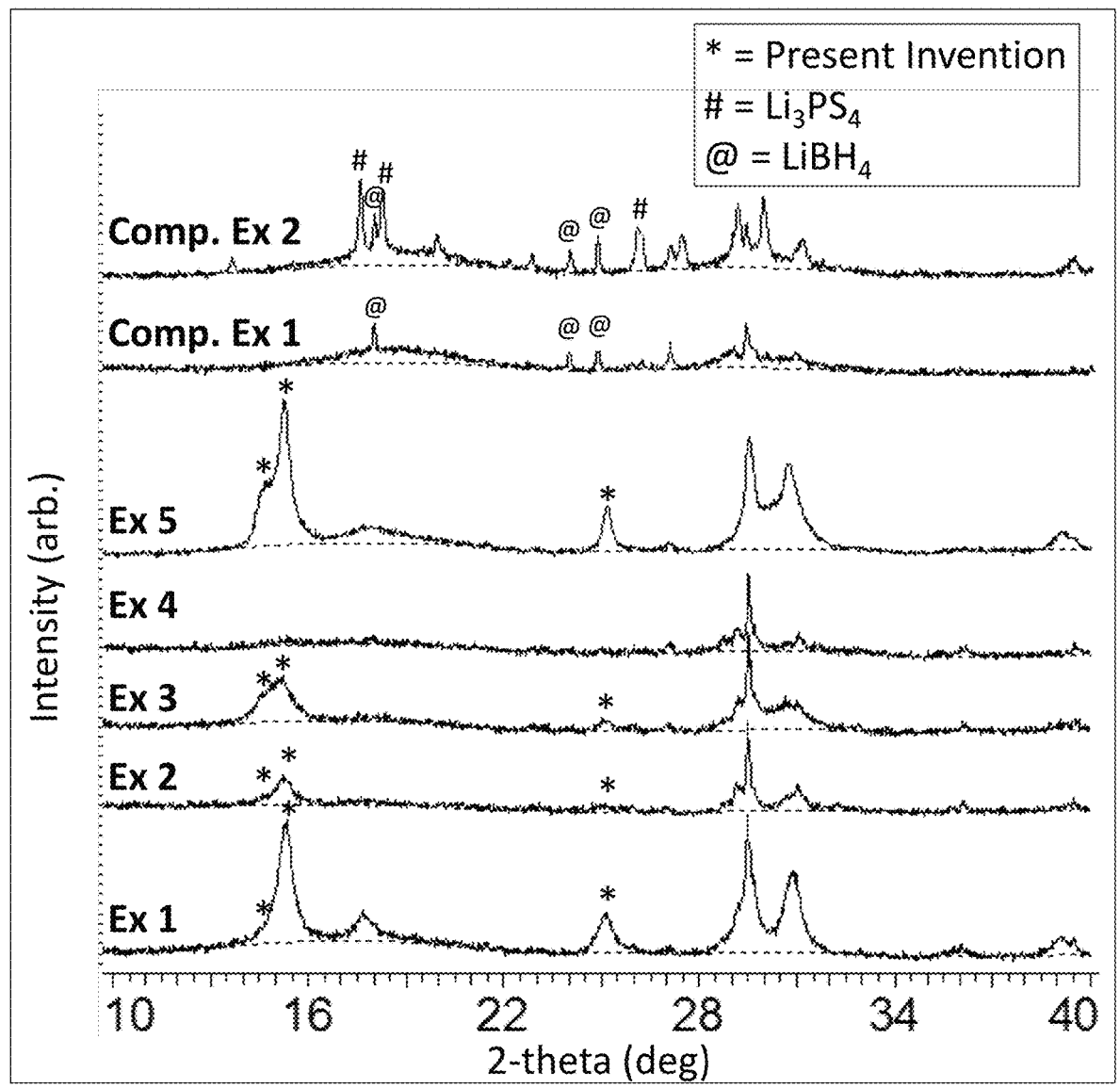
FIGURE 3A – x-ray diffraction

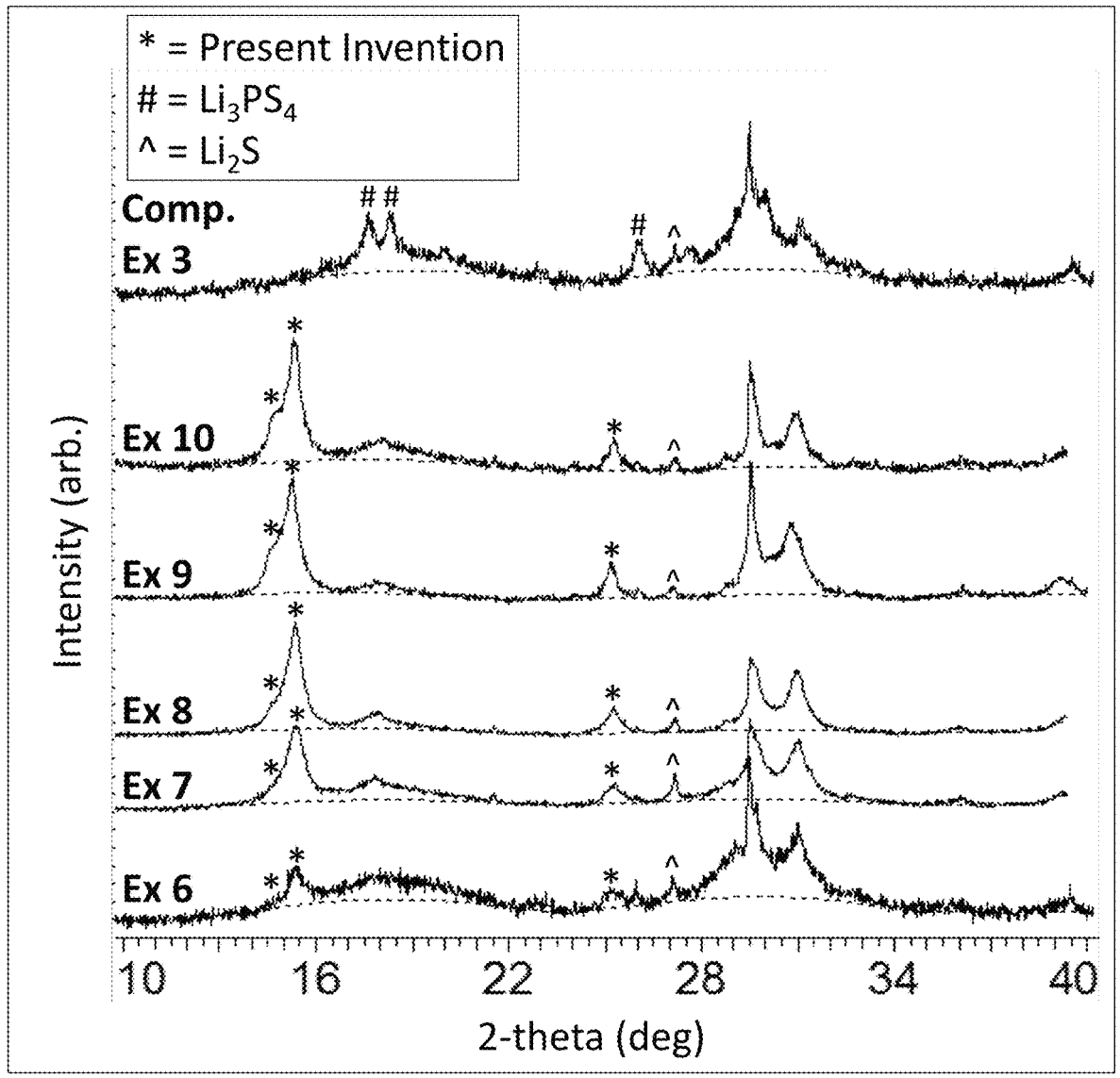
FIGURE 3B – x-ray diffraction

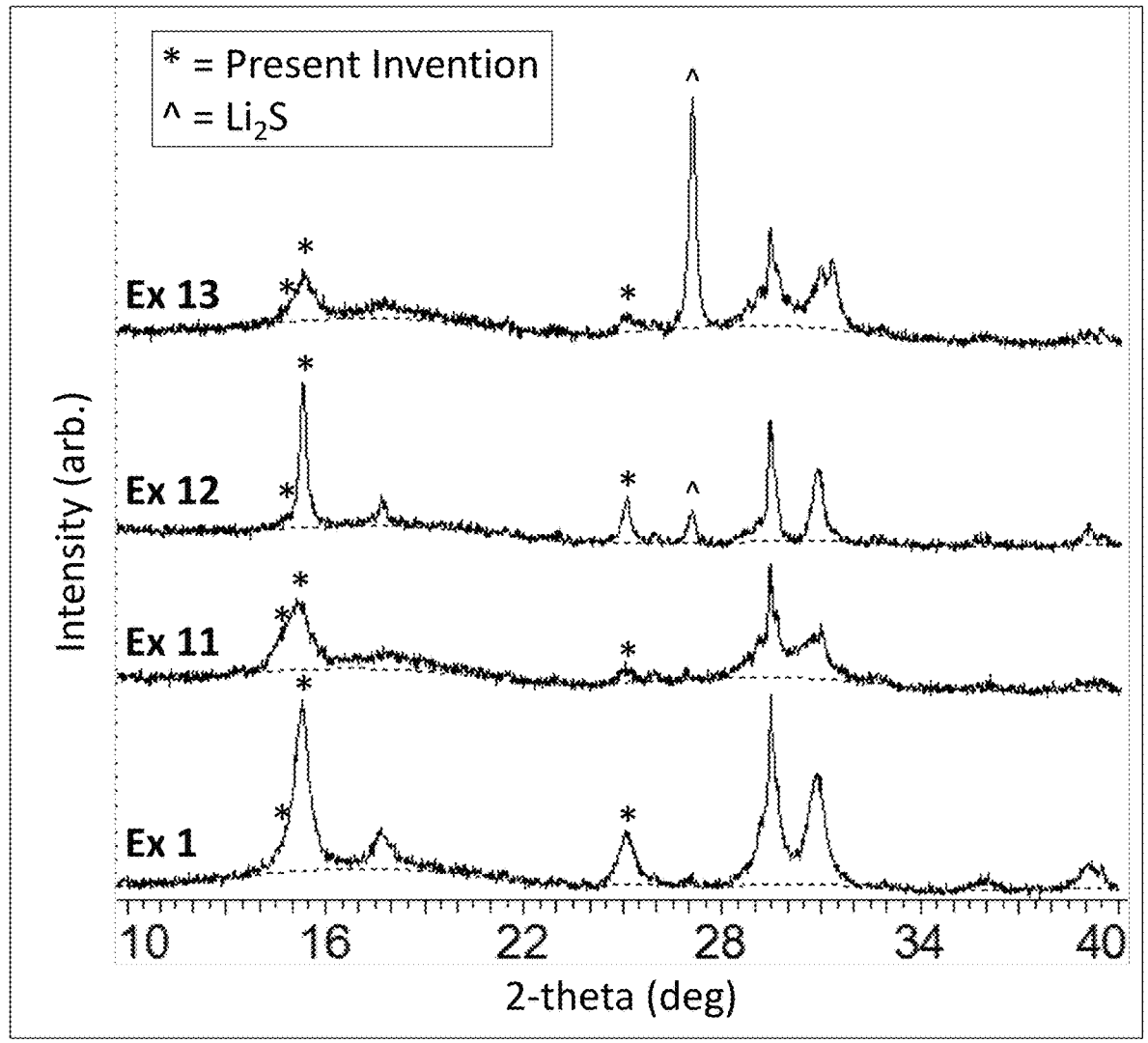
FIGURE 3C – x-ray diffraction

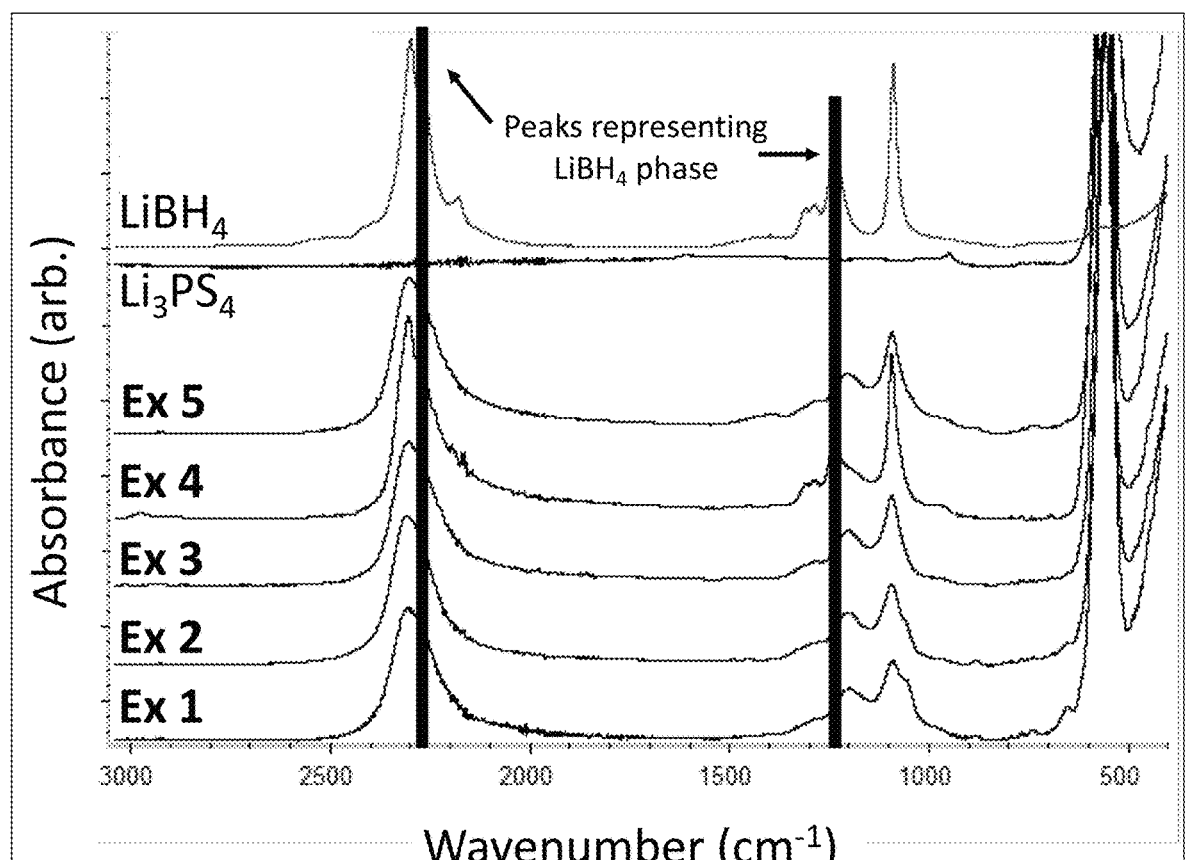
FIGURE 4A – FTIR spectroscopy

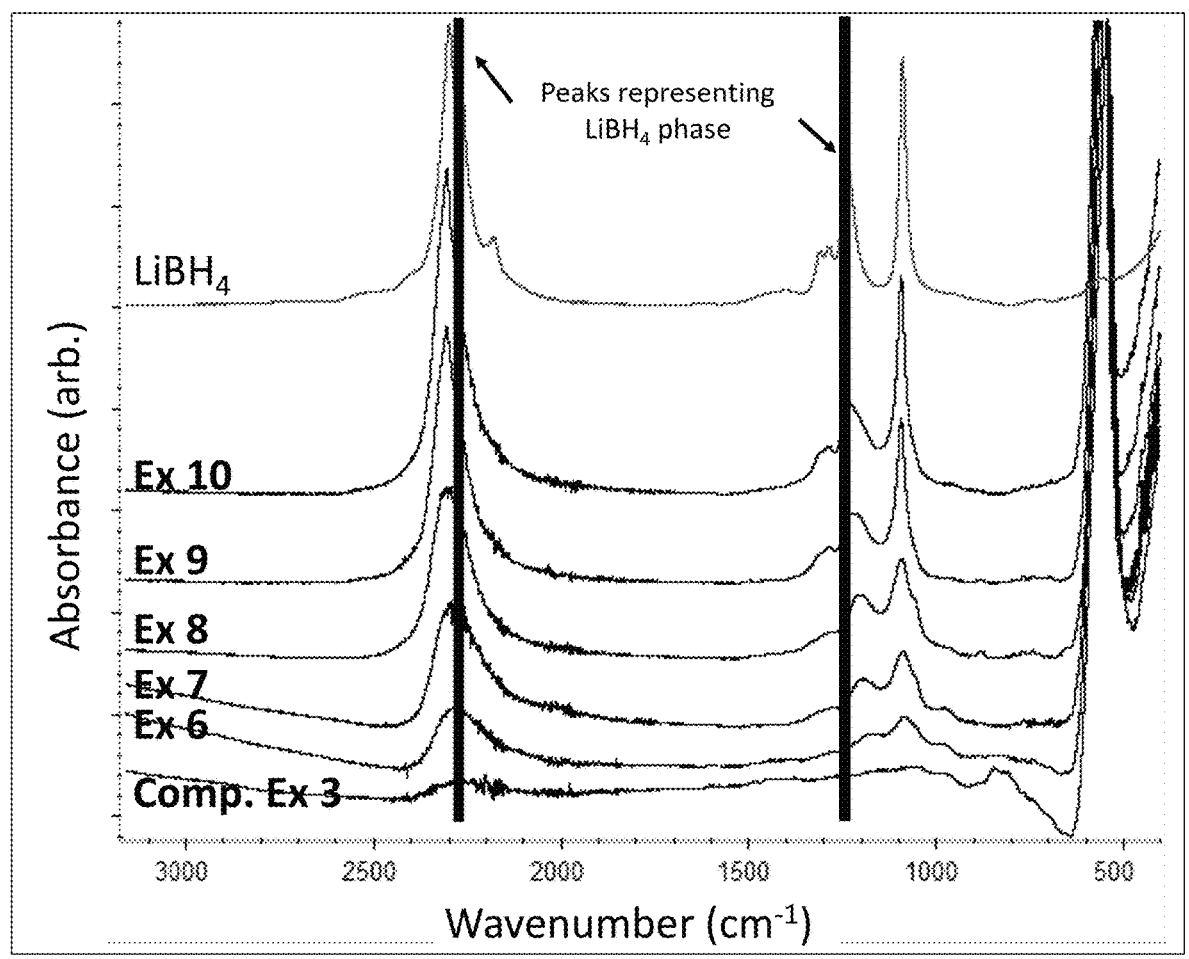
FIGURE 4B – FTIR spectroscopy

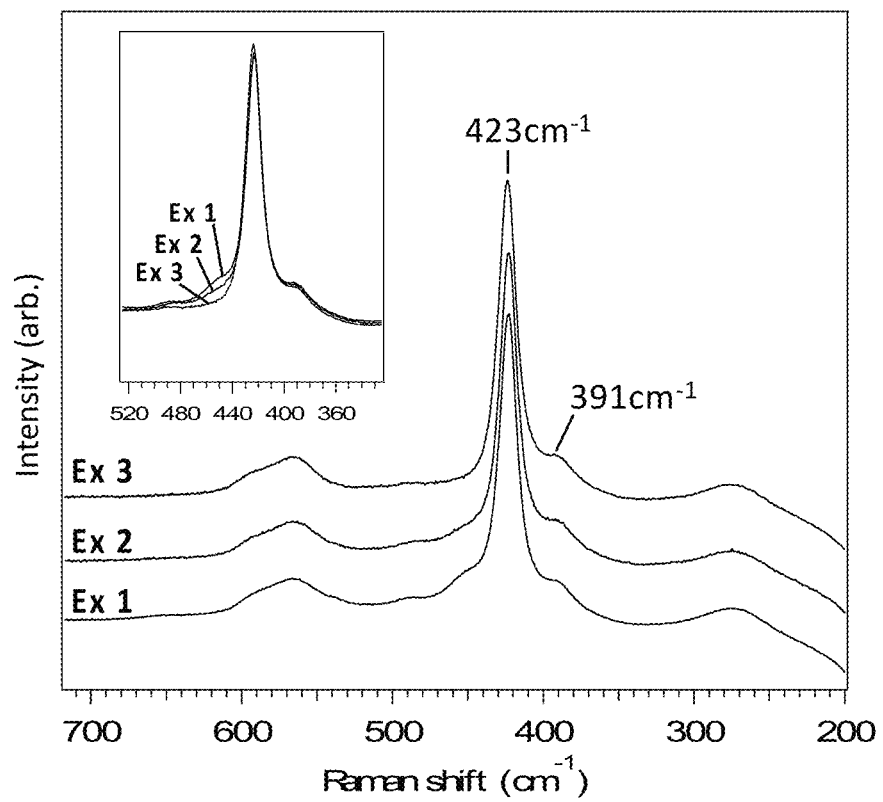
FIGURE 5 – Raman spectroscopy

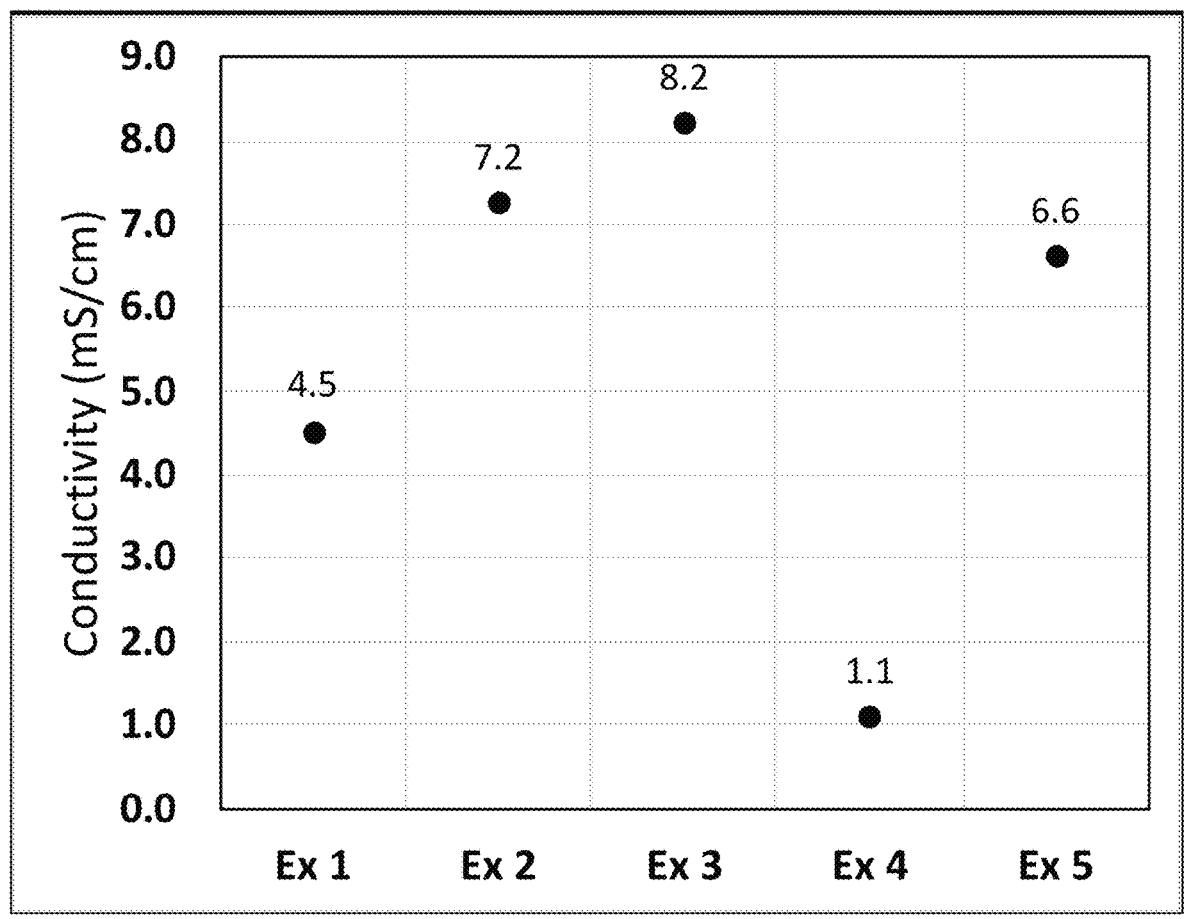
FIGURE 6A – Room temperature ionic conductivity

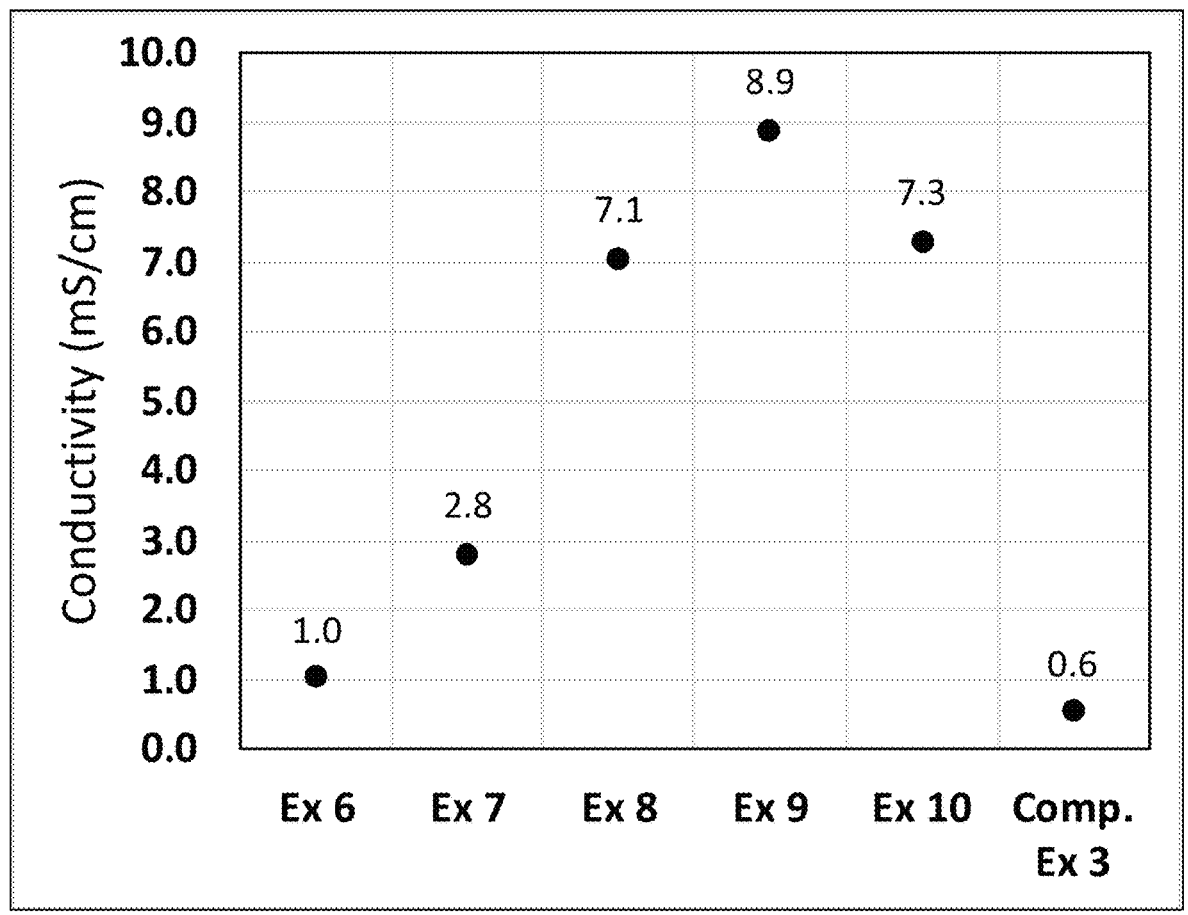
FIGURE 6B – Room temperature ionic conductivity

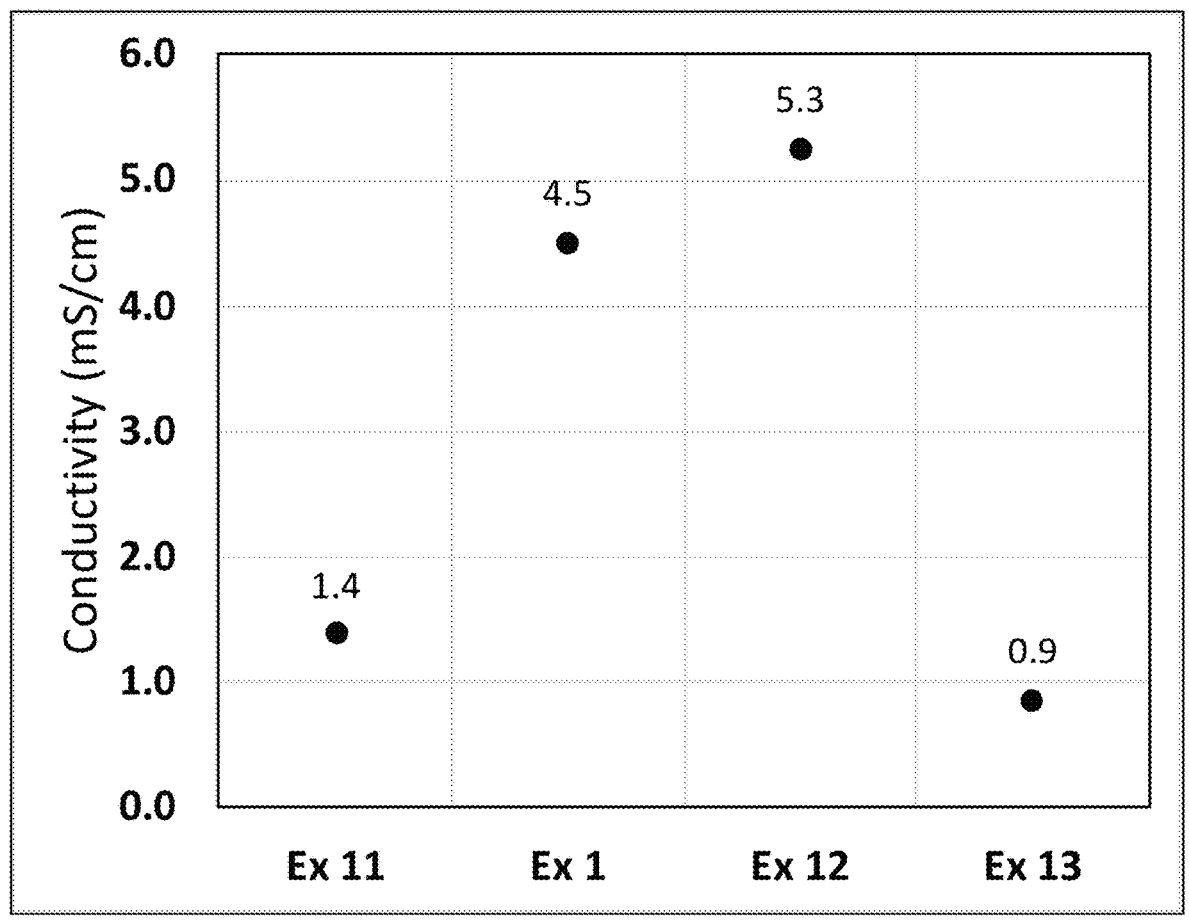
FIGURE 6C – Room temperature ionic conductivity

SOLID ELECTROLYTE MATERIAL AND SOLID-STATE BATTERY MADE THEREWITH

CROSS-REFERENCE TO RELATED APPLICATION

This application is a continuation of and is related to U.S. Nonprovisional application Ser. No. 17/210,119, filed on Mar. 23, 2021, which claims benefit of priority under 35 U.S.C. § 119 (e) from U.S. Provisional Application No. 62/993,571, filed on Mar. 23, 2020, and U.S. Provisional Application No. 63/088,233, filed on Oct. 6, 2020, all of which are hereby incorporated by reference in their entirety.

FIELD

Various embodiments described herein relate to the field of solid-state primary and secondary electrochemical cells, electrodes and electrode materials, electrolyte and electrolyte compositions and corresponding methods of making and using same.

BACKGROUND

The ever-increasing number and diversity of mobile devices, the evolution of hybrid/electric automobiles, and the development of Internet-of-Things devices is driving greater need for battery technologies with improved reliability, capacity (Ah), thermal characteristics, lifetime and recharge performance. Currently, although lithium solid-state battery technologies offer potential increases in safety, packaging efficiency, and enable new high-energy chemistries; improvements are needed. Specifically, work is ongoing to improve the production and performance properties of solid electrolyte compositions.

The most widely studied and adopted inorganic solid-state ionic conductors are the so-called "lithium argyrodites". These materials are derived from the natural mineral, Argyrodite, having composition $Ag_8GeS_6$, which was first reported in 1886 (Winkler, C. (1886) Germanium GE, ein nues, nichtmetallisches Element. Ber. Dtsch. Chem. Ges. 19: 201-211). When generalizing the composition of such a material, U.S. Pat. No. 8,075,865 provides formula $Li^+_{(12-n-y)}T^{n+}A^{2-}_{(6-y)}X^-_{(y)}$ that defines a "lithium argyrodite" having mobile lithium ions and utility as a solid electrolyte. Typically, lithium argyrodites adopt a cubic structure with space group F-43m; however, the natural mineral Argyrodite adopts an orthorhombic structure with space group $Pna2_1$. Generally, the terms "argyrodite-type" or "argyrodite-like" refer to a crystalline material satisfying the formula above, rather than any particular crystal structure.

It has been demonstrated that the lithium ion conductivity of argyrodite-type materials is correlated with the amount of component "X" in the formula $Li^+_{(12-n-y)}T^{n+}A^{2-}_{(6-y)}X^-_{(y)}$. Considering "T"=P, "A"=S, "X"=Cl, a common composition of a "lithium argyrodite", Adeli et al. (Adeli, P.; Bazak, J. D.; Park, K. H.; Kochetkov, I.; Huq, A.; Goward, G. R.; Nazar, L. F. Agnew. Chem. Int. Ed. (2019) 58, 8681) demonstrates an increase in conductivity up to y=1.5, at which point no further Cl can be incorporated into the structure. It is not possible with typical halogen species such as Cl, Br, and I to further increase the halogen component. The present disclosure overcomes this limitation by adopting the use of a pseudo-halogen species, such as $BH_4$, $BF_4$, etc., which permits raising of the limit of component "X" to a new ceiling of y=2 in the Argyrodite-type phase, which improves conductivity substantially.

It is further desirable to incorporate a pseudo-halogen species such as $BH_4$, $BF_4$, etc. due to the higher oxidation potential of such species, as compared to halogen species such as Cl, Br, etc. because higher oxidation potential can improve electrochemical stability against high voltage active materials. For example, U.S. Pat. No. 10,411,295 describes the incorporation of the pseudo-halogen species, $BH_4$, in the system $zLiBH_4\cdot(1-z)P_2S_5$ and its use as a solid electrolyte. However, the conductivity of this material is limited to <2 mS/cm due to limitations of the crystalline structure. Considering the limited availability of the component Li in this system, the formula $Li^+_{(12-n-y)}T^{n+}A^{2-}_{(6-y)}X^-_{(y)}$ described in U.S. Pat. No. 8,075,865 cannot be satisfied, meaning that the formation of an Argyrodite-type phase is not favored. Additionally, it is known that all argyrodite-type materials containing "T"=P and "A"=S contain the structural unit $PS_4$ as the sole building block containing phosphorus as can be demonstrated by the use of, for example, Raman spectroscopy. Raman spectra reported in U.S. Pat. No. 10,411,295 demonstrate that the structure of this material is not argyrodite-type due to the presence of alternative P—S bonding. In contrast, the present disclosure provides an argyrodite-type material incorporating pseudo-halogen species $BH_4$ and is the first $BH_4$-containing sulfide solid electrolyte to demonstrate high conductivity>>2 mS/cm.

Sakuda et al. (Sakuda, A.; Yamauchi, A.; Yubuchi, S.; Kitamura, N.; Idemoto, Y.; Hayashi, A.; Tatsumisago, M. ACS Omega (2018) 3(5), 5453-5458; hereinafter "Sakuda") describe an alleged argyrodite-type material incorporating "T"=P, "A"=S, and "X"=$BH_4$, and y=1 following a formula as described by $Li^+_{(12-n-y)}T^{n+}A^{2-}_{(6-y)}X^-_{(y)}$ in U.S. Pat. No. 8,075,865. The present disclosure differs from that of Sakuda in two important ways. First, clear differences in x-ray diffraction indicate differences in crystalline structure between that of Sakuda and that disclosed herein. In Sakuda, peaks in the range 25-35 degrees show higher relative intensity indicating a first difference in structure, and there is a lack of a diffraction peak at 14.6 degrees indicating a second difference in structure between that of Sakuda and that disclosed herein. Second, Sakuda teaches a crystalline fraction comprising y=1 in $Li^+_{(12-n-y)}T^{n+}A^{2-}_{(6-y)}X^-_{(y)}$ and teaches that y>1 is not possible whereas in the present disclosure, y is greater than 1 (1<y≤2). These structural and compositional characteristics lead to an unremarkable reported conductivity of 1.8 mS/cm for Sakuda's material, compared to that of the present disclosure with 1<y≤2 and conductivity measured up to 8.9 mS/cm.

SUMMARY

In an embodiment, an Argyrodite-type solid electrolyte material comprises Li, T, X and A wherein T is at least one of P, As, Si, Ge, Al, and B; X is $BH_4$; A is S, Se, or N. The solid electrolyte material may include glass ceramic and/or mixed crystalline phases, and exhibits high ionic conductivity and compatibility with high voltage cathodes and lithium metal anodes.

In another embodiment, an Argyrodite-type solid electrolyte material comprises Li, T, X and A wherein T is at least one element selected from the group consisting of P, As, Si, Ge, Al, and B; X is one or more halogens or $BH_4$, $BF_4$, $NH_2$, or $NO_3$ or a blend thereof; A is one or more of S, Se, and N; and the solid electrolyte material has peaks at 2θ=14.6°±0.25°, 15.3°±0.25°, and 25.1°±0.25° in X-ray diffraction measurement with Cu-Kα(1,2)=1.5418 Å.

In yet another embodiment, the solid electrolyte material further comprises at least one of glass ceramic phases, crystalline phases and mixed phases.

In another embodiment, the solid electrolyte material comprises a ratio of intensities of a peak at 2θ=15.3°±0.25° to a peak at 14.6°±0.25° is 5:1 or less.

In another embodiment, the solid electrolyte material comprises Li, T, X and A wherein X comprises a blend of one or more halogens or $BH_4$, $BF_4$, $NH_2$, or $NO_3$.

In another embodiment, the solid electrolyte material comprises a formula LPS·zLiX, where LPS denotes a mixture of $Li_2S$ and $P_2S_5$ in a glass forming ratio or $Li_2S$ and $B_2S_3$ in a glass forming ratio, and LiX represents LiCl, LiBr, LiI, $LiBH_4$, $LiBF_4$, $LiNH_2$, and $LiNO_3$, and 0.25≤z≤4.

In another embodiment, the solid electrolyte material comprises a formula LPSX·zLiX, where LPSX comprising a mixture of $Li_2S$, $P_2S_5$ and LiX in a glass forming ratio or $Li_2S$, $B_2S_3$ and LiX in a glass forming ratio, where LiX comprises one or more of LiCl, LiBr, LiI, $LiBH_4$, $LiBF_4$, $LiNH_2$, and $LiNO_3$, and 0<z≤25.

In another embodiment, the solid electrolyte material comprises Li, T, X and A wherein X comprising $BH_4$, and wherein the presence of a peak at 2θ=14.6°±0.25 in X-ray diffraction measurement with Cu-Kα(1,2)=1.5418 Å is controlled by tuning the specific synthesis conditions without changing the nominal stoichiometry.

In another embodiment, the solid electrolyte material comprises a formula $Li^+_{(12-n\cdot y)}T^{n+}A^{2-}_{(6-y)}X^-_{(y)}$ wherein y>1.

In another embodiment, the solid electrolyte material comprises a formula $Li^+_{(12-n\cdot y)}T^{n+}A^{2-}_{(6-y)}X^-_{(y)}$ wherein T=P, A=S, X=$BH_4$, and wherein y>1.

In another embodiment, the solid electrolyte material comprises a mixture of a crystalline phase having peaks at 2θ=14.6°±0.25°, 15.3°±0.25°, and 25.1°±0.25° in X-ray diffraction measurement with Cu-Kα(1,2)=1.5418 Å and of one or more of $LiBH_4$, $LiBF_4$, $LiNH_2$, $LiNO_3$, LiSCN, LiOCN.

In another embodiment, the solid electrolyte material comprises a crystalline Argyrodite-type phase comprising 50% or more by mol of total phases present.

In another embodiment, the solid electrolyte material comprises a primary peak is at 423±10 $cm^{-1}$ with an intensity ratio of at least 2:1 with other peaks present in the range 250-700 $cm^{-1}$ in Raman spectroscopic measurements with 532 nm excitation.

In another embodiment, the solid electrolyte material comprises a ratio of peak intensity at 2θ=15.3° to a peak at 2θ=17.5° is 1 or more.

In another embodiment, a lithium battery comprises (a) a positive electrode active material layer containing a positive electrode active material; (b) a negative electrode active material layer containing a negative electrode active material; and (c) a solid electrolyte layer disposed between the positive electrode active material layer and the negative electrode active material layer, wherein at least one of the positive electrode active material layer, the negative electrode active material layer, and the solid electrolyte layer comprises a sulfide solid electrolyte material comprising an Argyrodite-type solid electrolyte material comprising: Li, T, X and A wherein T is at least one element selected from the group consisting of P, As, Si, Ge, Al, and B; X is one or more halogens or $BH_4$, $BF_4$, $NH_2$, or $NO_3$ or a blend thereof; A is one or more of S, Se, and N; and the solid electrolyte material has peaks at 2θ=14.6°±0.25°, 15.3°±0.25°, and 25.1°±0.25° in X-ray diffraction measurement with Cu-Kα(1,2)=1.5418 Å.

In another embodiment, a method for producing a solid electrolyte material comprises mixing and milling a raw material composition comprising an element A or compound $Li_2A$ or $Li_3N$, an element T or sulfide of T, and a compound LiX until precursor materials are substantially amorphized or alloyed to create a final composition of sulfide glass; optionally heating the sulfide glass at a heat treatment temperature equal to or greater than a crystallization temperature of the material to synthesize the glass ceramics having peaks at 2θ =14.6°±0.25°, 15.3°±0.25°, and 25.1°±0.25° in X-ray diffraction measurement with Cu-Kα (1,2)=1.5418 Å, wherein the solid electrolyte material comprises glass ceramics comprising Li, T, X and A, and wherein T is at least one of P, As, Si, Ge, Al, and B; X is a halogen and/or $BH_4$, $BF_4$, $NH_2$, or $NO_3$; A is at least one of S, Se, and N.

In another embodiment, the method for producing a solid electrolyte material results in a final composition having a ratio of peak intensity at 2θ=15.3° to a peak at 2θ=17.5° is 1 or more.

In another embodiment, the method of producing a solid electrolyte material comprises mixing of suitable precursors including components Li, T, X, and A in a solvent capable of causing reaction between the precursors, removal of the solvent, and optionally a heat treatment at a temperature equal to or greater than the crystallization temperature of the material, wherein the solid electrolyte material comprises glass ceramics comprising Li, T, X and A wherein T is at least one of P, As, Si, Ge, Al, and B; X is a halogen and/or $BH_4$, $BF_4$, $NH_2$, or $NO_3$; A is at least one of S, Se, and N.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIG. 1 is a schematic sectional view of an exemplary construction of a lithium solid-state electrochemical cell including a solid electrode composition, in accordance with an embodiment.

FIG. 2 is a flow chart of a process for producing a solid electrolyte composition, in accordance with an embodiment.

FIG. 3a shows the results of x-ray diffraction (XRD) analysis of various embodiments of the present disclosure. Specifically, FIG. 3a shows results related to varying synthesis conditions, FIG. 3b shows results from varying the stoichiometry according to the examples compositions $Li_3PS_4$·$zLiBH_4$, and FIG. 3c shows results related to using different LPS stoichiometries as a basis for the present composition. X-ray diffraction measurements were carried out with a Bruker D8 Advance using a copper x-ray source and Lynxeye detector. Samples were sealed in home-built sample holder with a beryllium window. Measurements were taken over 5-40 degrees 2-theta with a step size of 0.02 degrees.

FIG. 4a shows the results of Fourier transform infrared spectroscopy (FTIR) analysis of various embodiments of the present disclosure. Specifically, FIG. 4a shows results related to varying the synthesis conditions, and FIG. 4b shows results relating to varying the stoichiometry according to the examples compositions $Li_3PS_4$·$zLiBH_4$. FTIR measurements were carried out with a Thermo Fisher Nicolet iS5 in ATR mode. Accumulations of 64 scans were collected for each spectrum with data spacing of 0.24 cm$^{-1}$.

FIG. 5 shows the results of Raman spectroscopy analysis of several embodiments of the present disclosure. Raman spectra were collected using a Jasco NRS-3100 spectrophotometer. Excitation source was 532 nm wavelength focused through a 5× microscope objective using 10 mW power and OD1 optical attenuator. Diffraction grating of 2400 l/mm yields approximate resolution of 2.5 cm$^{-1}$. Spectra are collected using 15 accumulations of 10 second exposures.

FIG. 6a shows the results of room temperature ionic conductivity measurements of the present disclosure. Specifically, FIG. 6a shows results related to varying synthesis conditions, FIG. 6b shows results from varying the stoichiometry according to the examples compositions Li$_3$PS$_4$·zLiBH$_4$, and FIG. 6c shows results related to using different LPS stoichiometries as a basis for the present composition. Ionic conductivity was measured as follows: approximately 0.250 g of powder was loaded into a pellet die with 16 mm diameter, and the powder was compacted to 300 MPa for 2 minutes using a benchtop hydraulic press. Compaction pressure was released and a measurement pressure of 8 MPa was applied. The cell was connected to a Biologic SP300 electrochemical workstation and complex impedance was measured over 7 MHz-1 Hz using 100 mV excitation. The resulting spectra was fit and used to calculate ionic conductivity.

DETAILED DESCRIPTION OF ILLUSTRATED EMBODIMENTS

In the following description, specific details are provided to impart a thorough understanding of the various embodiments of the disclosure. Upon having read and understood the specification, claims and drawings hereof, however, those skilled in the art will understand that some embodiments may be practiced without hewing to some of the specific details set forth herein. Moreover, to avoid obscuring the disclosure, some well-known methods, processes, devices, and systems finding application in the various embodiments described herein are not disclosed in detail.

Definitions

In this document the acronym "LPS" is used to represent an electrolyte phase comprised of Li$_2$S:P$_2$S$_5$ in a defined ratio. When not defined, a ratio of 3Li$_2$S:P$_2$S$_5$ may be assumed, which is known to yield the electrolyte phase Li$_3$PS$_4$. The term "semi-crystalline" may mean partially crystalline, having crystalline domains with sizes small enough to cause peak broadening in x-ray diffraction, having both glassy and crystalline character, containing crystalline and glassy phases, which may have different compositions, or any combination. The term "crystalline phase" may be understood to mean a material comprising fully crystalline or "semi-crystalline" atomic order. "Mechanochemical synthesis" may represent a synthesis technique, which uses the mixing or grinding energy of media against precursor materials to cause mixing and/or reaction of such materials. "Argyrodite-like" and "Argyrodite-type" may be used interchangeably to represent a material, which conforms to the chemical relationship defined in U.S. Pat. No. 8,075,865, which describes "lithium argyrodites": Li$^+_{(12-n-y)}$T$^{n+}$A$^{2-}_{(6-y)}$X$^-_{(y)}$.

FIG. 1 is a schematic sectional view of an exemplary construction of a lithium solid-state electrochemical cell including an electrode composition of the present disclosure. Lithium solid-state battery 100 includes positive electrode (current collector) 110, positive electrode active material layer (cathode) 120, solid electrolyte layer 130, negative electrode active material layer (anode) 140, and negative electrode (current collector) 150. Solid electrolyte layer 130 may be formed between positive electrode active material layer 120 and negative electrode active material layer 140. Positive electrode 110 electrically contacts positive electrode active material layer 120, and negative electrode 150 electrically contacts negative electrode active material layer 140. The solid electrolyte compositions described herein may form portions of positive electrode active material layer 120, negative electrode active material layer 140 and solid electrolyte layer 130.

Positive electrode 110 may be formed from materials including, but not limited to, aluminum, nickel, titanium, stainless steel, or carbon. Similarly, negative electrode 150 may be formed from copper, nickel, stainless steel, or carbon. Negative electrode 150 may be omitted entirely if negative electrode active material 140 possesses adequate electronic conductivity and mechanical strength. Positive electrode active material layer 120 may include, at least, a positive electrode active material including, but not limited to, metal oxides, metal phosphates, metal sulfides, sulfur, lithium sulfide, oxygen, or air, and may further include a solid electrolyte material such as the solid electrolyte compositions described herein, a conductive material and/or a binder. Examples of the conductive material include, but are not limited to, carbon (carbon black, graphite, carbon nanotubes, carbon fiber, graphene), metal particles, filaments, or other structures. Examples of the binder include, but are not limited to, polyvinyl chloride (PVC) polyanilene, poly(methyl methacrylate) ("PMMA"), nitrile butadiene rubber ("NBR"), styrene-butadiene rubber (SBR), PVDF, or polystyrene. Positive electrode active material layer 120 may include solid electrolyte compositions as described herein at, for example, 5% by volume to 80% by volume. The thickness of positive electrode active material layer 120 may be in the range of, for example, 1 μm to 1000 μm.

Negative electrode active material layer 140 may include, at least, a negative electrode active material including, but not limited to, lithium metal, lithium alloys, Si, Sn, graphitic carbon, hard carbon, and may further include a solid electrolyte material such as the solid electrolyte compositions described herein, a conductive material and/or a binder. Examples of the conductive material may include those materials used in the positive electrode material layer. Examples of the binder may include those materials used in the positive electrode material layer. Negative electrode active material layer 140 may include solid electrolyte compositions as described herein at, for example, 5% by volume to 80% by volume. The thickness of negative electrode active material layer 140 may be in the range of, for example, 1 μm to 1000 μm.

Solid electrolyte material included within solid electrolyte layer 130 is one or more of the solid electrolyte compositions as described herein. Solid electrolyte layer 130 may include solid electrolyte compositions as described herein in the range of 10% by volume to 100% by volume, for example. Further, solid electrolyte layer 130 may contain a binder or other modifiers. Examples of the binder may include those materials used in the positive electrode material layer as well as additional self-healing polymers and poly(ethylene) oxide (PEO). A thickness of solid electrolyte layer 130 is in the range of 1 μm to 1000 μm.

Although indicated in FIG. 1 as a lamellar structure, it is well known that other shapes and configurations of solid-state electrochemical cells are possible. Most generally, a lithium solid-state battery may be produced by providing a positive electrode active material layer, a solid electrolyte layer, and a negative electrode active material layer sequentially layered and pressed between electrodes and provided with a housing.

FIG. 2 is a flow chart of a process for producing a solid electrolyte composition useful for the construction of secondary electrochemical cells. Process 200 begins with preparation step 210 wherein any preparation action such as precursor synthesis, purification, and equipment preparation may take place. After any initial preparation, process 200 advances to step 220 wherein sulfur compounds, lithium compounds and other compounds, such as described herein, may be combined with an appropriate solvent and/or other liquids. Exemplary sulfur compounds may include, for example, elemental sulfur, phosphorus pentasulfide ($P_2S_5$), and lithium sulfide ($Li_2S$) typically in powder forms. Exemplary lithium compounds may include, for example, lithium metal (Li), lithium sulfide ($Li_2S$), lithium chloride (LiCl), lithium nitride ($Li_3N$), lithium borohydride ($LiBH_4$), Lithium fluoroborate ($LiBF_4$), lithium amide ($LiNH_2$), and lithium nitrate ($LiNO_3$) typically in powder forms. Exemplary solvents may include, for example, but are not limited to, aprotic chain hydrocarbons such as heptane, octane, or decane, aromatic hydrocarbons, such as benzene, toluene, or xylenes, and other solvents with a low propensity to generate hydrogen sulfide gas in contact with precursors or final electrolyte composition. The solvent is not particularly limited as long as it remains in the liquid state in part or in whole during the milling process and does not participate in deleterious reactions with the solid electrolyte precursors or final solid electrolyte composition. The ratios and amounts of the various compounds is not specifically limited as long as the combination permits the synthesis of the desired composition as indicated by the presence of specific X-ray diffraction features. The ratios and amounts may also vary according to specific synthesis conditions. For example, the ratio of solvent volume to precursor mass may need to be adjusted as solid electrolyte composition is adjusted to ensure complete milling of the precursors to generate the desired solid electrolyte phase discussed herein.

The amount of solvent added to the combination is not limited as long as the amount supports synthesis of the desired composition of solid electrolyte material. Multiple solvents may be mixed together with the noted compounds. Additional materials, such as co-solvents or polymers, may also be added during this step. Furthermore, the synthesis may be carried out with no solvent.

Next, in step 230 the composition may be mixed and/or milled for a predetermined period of time and temperature in order to create a solid electrolyte, as described above. Mixing time is not specifically limited as long as it allows for appropriate homogenization and reaction of precursors to generate the solid electrolyte. Mixing temperature is not specifically limited as long as it allows for appropriate mixing and is not so high that a precursor enters the gaseous state. For example, appropriate mixing may be accomplished over 10 minutes to 48 hours and at temperatures from 0 to 120 degrees Celsius. In one embodiment, the appropriate mixing may be accomplished over 10 minutes to 36 hours. In another embodiment, the appropriate mixing may be accomplished over 10 minutes to 24 hours while in another embodiment the appropriate mixing may be accomplished over 10 minutes to 12 hours. For the temperatures appropriate mixing takes place, in some embodiments the temperatures can range from 15 to 200 degrees Celsius. In another embodiment, the temperatures at which appropriate mixing can take place is from 20 to 150 degrees Celsius. In a further embodiment, the temperatures at which appropriate mixing can take place is from 25 to 120 degrees Celsius. Mixing may be accomplished using, for example, a planetary ball-milling machine or an attritor mill. In some embodiments the process described herein may be referred to as "mechanochemical synthesis".

Next, in step 240, the composition may be dried in an inert atmosphere such as argon or nitrogen or under vacuum for a predetermined period of time and temperature. Following drying, heat treatment may be performed during an optional step 250. The temperature of heat treatment is not particularly limited, as long as the temperature is equal to or above the temperature required to generate the crystalline phase of the present disclosure, or as required to enhance the ionic conductivity or the lithium metal compatibility. The material resulting from heat treatment step 250 may be single phase, and may also contain other crystalline phases, glass phases, and minor fractions of precursor phases.

Generally, the heat treatment time is not limited as long as the heat treatment time allows production of the desired composition and phase. The time may be in the range of, for example, one minute to 24 hours. Further, the heat treatment is conducted in an inert gas atmosphere (e.g., Argon), a reducing atmosphere (e.g., Hydrogen), or under vacuum. The heat treatment step 250 may be skipped entirely if the desired composition and phase is achieved during the earlier mixing or drying steps.

In final step 260, a completed composition may be utilized in the construction of electrochemical cells such as the cell of FIG. 1.

Example 1

First, $Li_3PS_4$ was prepared by mechanochemical synthesis. Next, the electrolyte composition was prepared from precursors including 20.13 g $Li_3PS_4$ and 4.87 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

Example 2

First, $Li_3PS_4$ was prepared by mechanochemical synthesis. Next, the electrolyte composition was prepared from precursors including 20.13 g $Li_3PS_4$ and 4.87 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 6 hours at 500 RPM. The material was collected and the solvent was removed at 70° C. under vacuum.

Example 3

First, $Li_3PS_4$ was prepared by mechanochemical synthesis. Next, the electrolyte composition was prepared from precursors including 20.13 g $Li_3PS_4$ and 4.87 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 6 hours at 350 RPM. The material was collected and the solvent was removed at 70° C. under vacuum.

Example 4

First, $Li_3PS_4$ was prepared by mechanochemical synthesis. Next, the electrolyte composition was prepared from precursors including 20.13 g $Li_3PS_4$ and 4.87 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 3 hours at 350 RPM. The material was collected and the solvent is removed at 70° C. under vacuum.

Example 5

The material resulting from Example 4 was taken and subjected to heat treatment. Inside of an argon-filled glovebox, a fabric heating mantle was loaded with a borosilicate beaker and preheated to 150° C. The powder was introduced into the pre-heated beaker and treated for 10 minutes, and then promptly removed from the heating mantle and allowed to cool naturally.

Example 6

First, $Li_3PS_4$ was prepared by mechanochemical synthesis. Next, the electrolyte composition was prepared from precursors including 23.13 g $Li_3PS_4$ and 1.87 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

Example 7

First, $Li_3PS_4$ was prepared by mechanochemical synthesis. Next, the electrolyte composition was prepared from precursors including 12.92 g $Li_3PS_4$ and 2.08 g $LiBH_4$ (Sigma-Aldrich Co.). Precursors were added to a 250 ml zirconia milling jar with 240 g zirconia milling media and 45 ml xylenes (Sigma-Aldrich Co.). The mixture was milled in a Retsch PM 100 planetary mill for 12 hours at 500 RPM. The material was collected and the solvent was removed at 70° C. under vacuum.

Example 8

First, $Li_3PS_4$ was prepared by mechanochemical synthesis. Next, the electrolyte composition was prepared from precursors including 12.08 g $Li_3PS_4$ and 2.92 g $LiBH_4$ (Sigma-Aldrich Co.). Precursors were added to a 250 ml zirconia milling jar with 240 g zirconia milling media and 45 ml xylenes (Sigma-Aldrich Co.). The mixture was milled in a Retsch PM 100 planetary mill for 12 hours at 500 RPM. The material was collected and the solvent was removed at 70° C. under vacuum.

Example 9

First, $Li_3PS_4$ was prepared by mechanochemical synthesis. Next, the electrolyte composition was prepared from precursors including 11.01 g $Li_3PS_4$ and 3.99 g $LiBH_4$ (Sigma-Aldrich Co.). Precursors were added to a 250 ml zirconia milling jar with 240 g zirconia milling media and 45 ml xylenes (Sigma-Aldrich Co.). The mixture was milled in a Retsch PM 100 planetary mill for 12 hours at 500 RPM. The material was collected and the solvent was removed at 70° C. under vacuum.

Example 10

First, $Li_3PS_4$ was prepared by mechanochemical synthesis. Next, the electrolyte composition was prepared from precursors including 10.35 g $Li_3PS_4$ and 4.65 g $LiBH_4$ (Sigma-Aldrich Co.). Precursors were added to a 250 ml zirconia milling jar with 240 g zirconia milling media and 45 ml xylenes (Sigma-Aldrich Co.). The mixture was milled in a Retsch PM 100 planetary mill for 12 hours at 500 RPM. The material was collected and the solvent was removed at 70° C. under vacuum.

Example 11

First, $Li_2S:P_2S_5=70:30$ was prepared by mechanochemical synthesis. Next, the electrolyte composition was prepared from precursors including 20.49 g $Li_2S:P_2S_5=70:30$ and 4.51 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

Example 12

First, $Li_2S:P_2S_5=80:20$ was prepared by mechanochemical synthesis. Next, the electrolyte composition was prepared from precursors including 19.71 g $Li_2S:P_2S_5=80:20$ and 5.29 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

Example 13

First, $Li_2S:P_2S_5=83.3:16.7$ was prepared by mechanochemical synthesis. Next, the electrolyte composition was prepared from precursors including 22.80 g $Li_2S:P_2S_5=83.3:16.7$ and 2.20 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

Comparative Example 1

First, $Li_3PS_4$ was prepared by mechanochemical synthesis. Next, 4.10 g $Li_3PS4$ and 0.90 g $LiBH_4$ were added to an agate mortar and pestle and ground by hand for 10 minutes where a homogeneous mixture was observed. This material was studied with no further processing.

Comparative Example 2

The material resulting from Comparative Example 1 was taken and subjected to heat treatment. Inside of an argon-filled glovebox, a fabric heating mantle was loaded with a borosilicate beaker and preheated to 140 C. The powder was introduced into the pre-heated beaker and treated for 10 minutes, and then promptly removed from the heating mantle and allowed to cool naturally.

Comparative Example 3

First, $Li_3PS_4$ was prepared by mechanochemical synthesis. Next, the electrolyte composition was prepared from precursors including 24.34 g $Li_3PS_4$ and 0.65 g $LiBH_4$ (Sigma-Aldrich Co.). Precursors were added to a 250 ml zirconia milling jar with 400 g zirconia milling media and 60 ml xylenes (Sigma-Aldrich Co.). The mixture was milled in a Retsch PM 100 planetary mill for 12 hours at 500 RPM. The material was collected and the solvent was removed at 70° C. under vacuum.

In some embodiments, the present disclosure may be realized over a range of synthesis conditions and stoichiometries, and the examples and data presented herein are intended to aid understanding of the claimed conditions and ranges. It is to be understood that that the data presented here is non-exhaustive.

The effect of synthesis conditions is evidenced in Examples 1-4 and Comparative Examples 1-2. Here, demonstrating various synthesis conditions through the use of planetary ball milling, several observations can be made. When decreasing the total energy input into the precursors during milling, specific changes to x-ray diffraction (FIG. 3a), FTIR spectra (FIG. 4a), Raman spectra (FIG. 5), and conductivity (FIG. 6a) were observed. Peaks in x-ray diffraction may become weaker due to lower crystallinity or smaller crystallite size. Different levels of synthesis energy may cause differences in the ratio of x-ray peaks at 14.6±0.25 and 15.3±0.25 degrees (CuKα radiation), and this ratio may be correlated to ionic conductivity as demonstrated in FIG. 6a. When the total energy input reached a certain lower threshold, the product became x-ray amorphous, as observed for Ex 4 in FIG. 3a. X-ray amorphous may mean either glassy, nano-crystalline, with domains too small for the instrumentation to resolve into peaks, or a combination of the two. When a product of milling synthesis is x-ray amorphous, it may be subject to heat treatment to cause crystallization and the appearance of the phase of the present disclosure. When the product of Ex 4 was subjected to 10 min at 150° C. to create Ex 5, crystallization substantially occurred and the phase of the present disclosure was observed.

Further detail on the synthesis process is gained when examining the FTIR spectra presented in FIG. 4a. In FIG. 4a, data from Ex 1-5 is presented alongside spectra of pure $Li_3PS_4$ and $LiBH_4$ materials. The spectra of $LiBH_4$ shows sharp distinguishing features and two of these peaks are labeled as representative of this material for comparison with Ex 1-5. For Ex 1-3 relatively little difference was observed in FTIR spectra. In materials of the composition and synthesis conditions described by these examples, the sharp features of $LiBH_4$ have softened and changed slightly, which indicates an integration with $Li_3PS_4$ to form the phase of the present disclosure. The spectra indicate that the $BH_4$ unit remained intact but now had a slightly different local environment compared to the environment in $LiBH_4$. When examining the FTIR spectra of Ex 4, there is clear signature of $LiBH_4$ phase still present in the product, and conductivity was low, as shown in FIG. 6a. However, a subsequent heat treatment of 10 min at 150° C. was sufficient to complete the integration of $LiBH_4$, crystallize the phase of the present disclosure, and improve conductivity 6×.

The x-ray diffraction patterns of the present disclosure presented in FIG. 3 showed, to the best resolution of instrumentation, the same number of peaks and peak locations as is typically observed for lithium argyrodites utilizing Br instead of $BH_4$. Considering the similarity in ionic radii of Br (196 pm) and $BH_4$ (193 pm), a similar d-spacing and peak location may be expected. This implies the existence of the crystalline phase typically adopted by lithium-based argyrodite-type materials. The only non-typical peak observed in the x-ray diffraction data was the peak at 14.4±0.25 deg and the existence and implications of this peak are discussed in detail elsewhere in this disclosure.

Examining the Raman spectra for Ex 1-3, presented in FIG. 5, a primary peak at 423 $cm^{-1}$ was observed, along with a minor peak at 391 $cm^{-1}$. The peak at 391 $cm^{-1}$ corresponds to P—S vibrations in a $P_2S_6^{4-}$ unit, which is an impurity phase brought into the synthesis with the $Li_3PS_4$ precursor. Importantly, the main peak in the Raman spectra at 423 $cm^{-1}$ corresponds to P—S vibrations in a $PS_4^{3-}$ structural unit. The crystalline structure of Argyrodite-type materials is composed exclusively of $PS_4$ units and no other units (such as $P_2S_6^{4-}$, $P_2S_7^{4-}$) are present in the structure. Given the observed x-ray diffraction pattern showing the number and location of peaks typical of argyrodite-type materials, and the Raman spectra showing the majority presence of $PS_4$ local structural units, it is concluded that the material of the present disclosure is also, in majority, an argyrodite-type material.

A further detail in Raman spectra of Ex 1-3 is shown in the inset of FIG. 5. Here the variation in a shoulder peak at 452 $cm^{-1}$ was seen. It is noted that the strength of this peak seems correlated with the energy input during milling synthesis, and that subsequently the strength of this peak may also be correlated with conductivity. This peak could indicate a small structural disorder that alters local crystal symmetry that has an effect on ion mobility.

Comparative Examples 1-2, shown in FIG. 3a, demonstrate that it is not sufficient to simply mix the $Li_3PS_4$ and $LiBH_4$ precursor phases and apply heat to create the phase of the present disclosure, and further synthesis energy input, such as milling or alternative reaction pathways through means of solution-phase reactions, may be necessary.

In another embodiment, other synthesis routes may be used. For example, a method comprising the mixing of suitable precursors providing components Li, T, X, and A in a solvent capable of causing reaction between the precursors, removal of the solvent, and optional heat treatment at a temperature equal to or greater than the crystallization temperature of the material, may be used to synthesize the solid electrolyte material discussed herein.

Other embodiments of the present disclosure relate to a range of nominal stoichiometry within which the present disclosure may be realized. Ex 6-10 and Comp. Ex 3 serve as a demonstration of the range of $LiBH_4$ fraction in the precursors. Generally, the present disclosure is demonstrated over the range LPS·$zLiBH_4$ where 0.25<z<4. Ex 6-10 demonstrated this range, and the resulting diffraction pattern are shown in FIG. 3b. The peaks of the present disclosure were observed in all cases. Comparative Example 3 demonstrated the result when z=0.2. Only peaks of the $Li_3PS_4$ precursor phase were observed as the quantity of $LiBH_4$ available to the system was too low to substantially create the crystalline phase of the present disclosure.

Examining the trends in conductivity for Ex 6-10 as shown in FIG. 6b, it was observed that conductivity increased from z=0.7 to z=3, then decreased when increasing LiBH$_4$ content further to z=3.7. Stated briefly, conductivity increases as the fraction of LiBH$_4$ in the system increases, up to a limit, where conductivity begins to decrease thereafter.

For Ex 6-8, the FTIR spectra shown in FIG. 4b showed B—H bonding modified slightly from that found in pure LiBH$_4$. There was no signature of LiBH$_4$ in Ex 6-8. However, the spectra of Ex 9-10 clearly showed the additional presence of the characteristic peaks of LiBH$_4$ phase. The presence of LiBH$_4$ phase indicated that at the nominal compositions reported in Ex 9-10 the fraction of LiBH$_4$ in the precursors was too high to be incorporated into a single phase.

The nominal composition of Ex 8 corresponded to Li$_5$PS$_4$(BH$_4$)$_2$. Data presented herein describe how the present disclosure can be described as an argyrodite-type phase. With an understanding that a typical argyrodite-type material exists in space group F-43m, Wyckoff positions 4a and 4d may possibly be populated either by a chalcogen (typically sulfur) or by a halogen (typically Cl or Br) or pseudohalogen. Considering a hypothetical example involving the pseudo-halogen BH$_4$, when half of the available 4a+4d sites are filled with BH$_4$, the nominal stoichiometry of a resulting argyrodite-type material would be Li$_6$PS$_5$(BH$_4$). Continuing, if all of the available 4a+4d sites are filled with BH$_4$ the nominal stoichiometry of a resulting argyrodite-type material would be Li$_5$PS$_4$(BH$_4$)$_2$. Therefore, the limit of halogen or pseudo-halogen incorporation into an argyrodite-type material should be when y=2 in Li$^+_{(12-n-y)}$T$^{n+}$A$^{2-}_{(6-y)}$X$^-_{(y)}$ as beyond this level there is essentially no place for the halogen or pseudo-halogen to go in the structure so as to remain energetically favorable.

The FTIR data in FIG. 4b showed the presence of LiBH$_4$ only for nominal compositions where y>2 in Li$^+_{(12-n-y)}$T$^{n+}$A$^{2-}_{(6-y)}$X$^-_{(y)}$. Based on this observation, the present disclosure is the first realization of an argyrodite-type material where a halogen or pseudo-halogen occupies substantially all 4a and 4d Wyckoff sites, essentially resulting in halogen or pseudo-halogen saturation of the structure. As this has been extensively attempted but never realized with halogens such as Cl, Br, etc., it may be the unique properties of a pseudo-halogen such as BH$_4$ that allow y=2 in Li$^+_{(12-n-y)}$T$^{n+}$A$^{2-}_{(6-y)}$X$^-_{(y)}$ and the discovery of the present disclosure.

Another embodiment of the present disclosure relates to a further range of nominal stoichiometry within which the present disclosure may be realized. Using the system (Li$_2$S:P$_2$S$_5$):2LiBH$_4$, Ex1 and Ex 11-13 compared a range of Li$_2$S:P$_2$S$_5$ ratios. In such embodiments, the nominal composition of the Li$_2$S:P$_2$S$_5$ fraction was varied from 70:30 on the low end to 83:17 on the high end. General observations from x-ray diffraction results presented in FIG. 3c include the variation of the ratio of peaks at 14.6±0.25 vs 15.3±0.25 and the amount of relative Li$_2$S impurity. At a composition Li$_2$S:P$_2$S$_5$ of 80:20 presented in Ex 12, the limit of the glass forming ratios was approached, and an elevated amount of Li$_2$S was observed. However, increasing conductivity was generally observed in FIG. 6c up to this limit. For a composition Li$_2$S:P$_2$S$_5$=83:17 there was an excess of Li$_2$S present in x-ray diffraction as this composition may be outside of a glass forming ratio, and conductivity was decreased due to the stoichiometric imbalance of the system and strong presence of Li$_2$S impurity phase.

In another embodiment, there may exist a peak centered at 2θ=14.6°±0.25°. This peak may be a component of the main structure of the composition or a secondary phase. The presence of this peak is associated with an increase in ionic conductivity and is therefore desired when high lithium conductivity is required. In the case where component X is a polyanionic species such as BH$_4^-$, BF$_4^-$, etc., this additional peak may arise from rotations or displacements of the polyhedral group, such that the apex species (H, F, etc.) occupies a typically unoccupied region of the crystalline structure and causes a new diffraction peak that would not be seen if component X were a singular anion (Cl$^-$, Br$^-$, etc.). This diffraction peak may be a result of the polyanionic species itself, or result from new scattering induced as the surrounding structure relaxes and repositions to compensate for the polyanionic motion and lithium ion motion. As the rotations and displacements of polyhedra are often correlated to mobility of ionic charge carriers, the correlation of ionic conductivity with the strength of this measurable diffraction peak may be understood by considering that the strength of the peak is itself tied to rotations and displacements of the anionic polyhedra.

The general chemical composition may be denoted as LPS·zLiX, where T, A and X represent elements as described herein, and LPS denotes, for example, a mixture of Li$_2$S and P$_2$S$_5$ in a glass forming ratio, and/or Li$_2$S and B$_2$S$_3$ in a glass forming ratio. Glass forming ratios may be in the range 1:1 to 4:1 for Li$_2$S:P$_2$S$_5$ and 1:1 to 3:1 for Li$_2$S:B$_2$S$_3$. In another embodiment, the Li$_2$S:P$_2$S$_5$ component may be primarily crystalline or primarily glassy, as long as the mixing and/or milling step is sufficient to combine this material thoroughly with the other precursors in a way that allows creation of the desired electrolyte composition.

Compositions may be in the range of 0≤z≤25. In another embodiment, the compositions may be in the range of 0.15≤z≤15. In a further embodiment the compositions may be in the range of 0.20≤z≤10. In yet another embodiment, the compositions may be in the range of 0.25≤z≤4. In yet another embodiment, the compositions may be in the range of 1≤z≤3. The composition may be single phase or mixed phase, with other crystalline phases identified by XRD peaks at 2θ=17.5 and 18.2°. The compositions may also contain a crystalline phase associated with one or more lithium halides or lithium sulfide. As is typical of sulfide materials the composition may be a "glass-ceramic", with both crystalline and glassy phases co-existing.

In another embodiment, the general chemical composition may be denoted as LPSX·zLiX, where LiX comprises one or more of LiCl, LiBr, LiI, LiBH$_4$, LiBF$_4$, LiNH$_2$, and LiNO$_3$, and LPSX comprises a mixture of Li$_2$S, P$_2$S$_5$ and LiX in a glass forming ratio, and Li$_2$S, B$_2$S$_3$ and LiX in a glass forming ratio, where in some embodiments, the "X" in LPSX and in the LiX are the same, and in another embodiment, the "X" in LPSX and in the LiX are not the same. The glass forming ratios may be in the range 1:1:1 to 4:1:4 for Li$_2$S:P$_2$S$_5$:LiX and 1:1:1 to 3:1:4 for Li$_2$S:B$_2$S$_3$:LiX. In some embodiments, LiX comprises LiBH$_4$, LiBF$_4$, LiNH$_2$, and LiNO$_3$. In another embodiment, LiX is LiBH$_4$. Compositions may be in the range of 0<z≤25. In another embodiment, the compositions may be in the range of 0<z≤15. In a further embodiment, the compositions may be in the range of 0<z≤10. In yet another embodiment, the compositions may be in the range of 0<z≤4. In yet another embodiment, the compositions may be in the range of 0<z≤2. The composition may be single phase or mixed phase, with other crystalline phases identified by XRD peaks at 2θ=17.5° and 18.2°. The compositions may also contain a crystalline phase associated with one or more lithium halides or lithium sulfide. As is typical of sulfide materials the composition may be a "glass-ceramic", with both crystalline and glassy phases co-existing.

A ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 25:1 or less. In another embodiment, the ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 20:1 or less. In yet another embodiment, the ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 10:1 or less. In yet another embodiment, the ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 5:1 or less. In yet another embodiment, the ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 2:1 or less. In another embodiment, the ratio of peak height between a peak at $2\theta=15.3°\pm0.25°$ and $14.6°\pm0.25°$ in X-ray diffraction (XRD) measurement with Cu-K$\alpha$(1,2)=1.5418 Å may be 1.5:1 or less. These peaks may be separated by $0.3°$ or more.

An exemplary composition is defined by LPS·2LiX=$Li_5PS_4(BH_4)_2$. Such a composition yields a semi-crystalline phase of the present disclosure. The structure of this semi-crystalline phase is conducive to high ionic conductivity, and the presence of the hydride component may aid in the formation of stable, low-resistance interfaces against lithium metal and high voltage cathode active materials.

The crystalline or semi-crystalline phase resulting from a composition, such as $Li_5PS_4(BH_4)_2$ may adopt the typical cubic structure of lithium argyrodites with space group F-43m, or adopt a very similar structure with slightly altered symmetry. The rationale for altered symmetry is provided above in an explanation of how rotations and displacements of polyanionic components may lead to atomic occupancy of lattice sites not explicitly occupied within the framework of the F-43m space group. The adoption of this type of structure is non-obvious. Considering the chemical system $Li_{7-y}PS_{6-y}X_y$, it has been demonstrated that when X=Cl the solid solution limit is y=1.5, and this limit is lower for X=Br at y=1.25 due to the larger ionic radius of Br compared to Cl [Nazar, Angewandte Chemie, 2019]. Since the ionic radius of $BH_4^-$ is similar to Br, it can be expected that the solid solution limit may be y≤1.25. However, in the present disclosure, using, for example, $BH_4$ as the pseudo-halogen, this limit is y>1.25 as evidenced by the trends in conductivity and lack of $LiBH_4$ phase in x-ray diffraction and FTIR spectroscopy. Additionally, the known compound $Ag_5PS_4Cl_2$ [Jörgens, Solid State Sciences, 2007] adopts an orthorhombic structure (Amm2), which is very different from the cubic lithium Argyrodite family (F-43m), and there is no presently known lithium analog with this composition. Therefore, the present disclosure may comprise the first example of a lithium ion conductor with a cubic Argyrodite structure with a halogen or pseudo-halogen level approaching y=2 in $Li_{7-y}PS_{6-y}X_y$.

In another embodiment, the system LPS·yLiX may yield a crystalline fraction with the nominal composition $Li_5PS_4(X)_2$ along with a glassy fraction. The ratio of crystalline and glassy fractions would then be determined by the nominal starting composition. The glassy fraction may comprise ion conducting material and may have a composition similar to the LPS precursor. When the amount of LiX is higher than can be supported by the amount of LPS, the resulting material may comprise $Li_5PS_4(X)_2$ crystalline fraction, glassy or crystalline LiX, and additional glassy phase. In some embodiments LiX may be $LiBH_4$, where component X is $BH_4$.

The enhanced conductivity of the present disclosure compared to related art may be due to unique ion conduction mechanisms. The polyanionic nature of, for example, the $BH_4$ anion may allow for a "paddle-wheel" effect, whereby rotational freedom of the anionic unit allows for easier transit of a passing lithium ion through alterations of the local potential energy space during rotation. Additionally, the compositions presented herein may benefit from disorder introduced by, for example, the $BH_4$ anion as observed by low intensity XRD patterns with broadened peaks. It is known that for Cl- and Br-containing argyrodites, disorder amongst the S and Cl/Br sites leads to high conductivity, but for the I-containing argyrodite a lack of such disorder leads to low conductivity. Such disorder or local lattice strain in proximity to the $BH_4$ unit may exist in the present invention and lead to enhanced ionic conductivity.

Further, the present disclosure may be nanocrystalline in nature with crystalline domain size on the order of 100 nm or less. This may be a result of processing conditions or reaction mechanisms among the precursors and may lead to benefits for ionic conductivity and operation at high current density with lithium metal anodes. With nanocrystalline domains a more uniform SEI may develop at the interface with lithium metal anodes which may be beneficial to support high current densities without the nucleation and growth of dendrites.

Aside from microstructural considerations, enhanced stability compared to related art compositions when used in combination with a metallic lithium anode may stem from several factors related to the chemistry of the material. In particular for embodiments comprising hydride or amide species, the SEI formed in contact with lithium metal may have a lower overall resistance to charge transfer due to the presence of moderately-conducting lithium-hydride species and the dilution of any poorly-conducting lithium-sulfide species. The arrangement and structure of the SEI components may exist in such a way as to create more uniform electric field distribution, ion flux, and/or lithium plating/stripping. Additionally, the surface energy of the present composition may be such that it achieves good wetting by lithium metal and/or maintains mechanical contact during higher levels of interface polarization or plating/stripping rates. In this context, "enhanced stability" may mean the use of higher current densities without unexpected voltage deviations or short circuiting, or longer cycle life, or higher coulombic efficiencies. A "low voltage" anode active material may include, but is not limited to, lithium metal, lithium alloys, Si, Sn, graphitic carbon, hard carbon, composites of these, or other materials or composites with a working voltage near or below 1.0V vs Li/Li$^+$.

It is observed that structural modification or the introduction of a secondary phase may lead to an increase in ionic conductivity. These modifications can be controlled during the synthesis process by controlling milling speed or milling temperature or total energy input to the precursor composition.

During the synthesis there may be a generation of gas. The presence of gaseous species indicates that the final composition may differ slightly from the nominal starting composition. The gas generation may be related to the specific synthesis conditions and be further related to the observation of structural modification or secondary phase generation described above.

The presence of structural modifications or the secondary phase described above has been associated with decreased performance of a lithium metal anode. This may indicate that synthesis-related chemical changes, evidenced by gas generation during milling synthesis, lead to changes in the SE-Li interface composition and properties. Therefore, to achieve highest performance when using a lithium metal anode, it may be desirable to synthesize the present composition under conditions that minimize the structural modifications or secondary phase described above.

When used as part of a positive electrode active material layer in combination with a high voltage cathode active material stability advantages compared to related art compositions are realized which may stem from the chemistry of the present composition. The incorporation of a "superhalogen" such as $BH_4$ or $BF_4$ may lead to an overall increase of the oxidation potential of the electrolyte composition due to the high electron affinity of this species.

Features described above as well as those claimed below may be combined in various ways without departing from the scope hereof. The preceding examples illustrate some possible, non-limiting combinations. It should thus be noted that the matter contained in the above description or shown in the accompanying drawings should be interpreted as illustrative and not in a limiting sense. The above-described embodiments should be considered as examples of the present disclosure, rather than as limiting the scope of the disclosure. In addition to the foregoing embodiments of disclosure, review of the detailed description and accompanying drawings will show that there are other embodiments of such disclosure. Accordingly, many combinations, permutations, variations and modifications of the foregoing embodiments of disclosure not set forth explicitly herein will nevertheless fall within the scope of such disclosure. The following claims are intended to cover generic and specific features described herein, as well as all statements of the scope of the present method and system, which, as a matter of language, might be said to fall there between.

What is claimed is:

1. A solid electrolyte material comprising:
    Li, T, X and A, wherein T is at least one element selected from the group consisting of P, As, Si, Ge, Al, and B; X is one or more halogens or $BH_4$, $BF_4$, $NH_2$, or $NO_3$, or a combination thereof; A is one or more of S, Se, and N;
    wherein the solid electrolyte material has peaks at $2\theta=14.6°\pm0.25°$, $15.3°\pm0.25°$, and $25.1°\pm0.25°$ in an X-ray diffraction measurement with Cu-K$\alpha$(1,2) =1.5418 Å,
    and wherein the solid electrolyte material has a Raman spectrum comprising a peak at 423 cm$^{-1}$, wherein the peak at 423 cm$^{-1}$ is the highest intensity peak in a range from 200-700 cm-1.

2. The solid electrolyte material of claim 1, wherein a ratio of intensities of the peak at $2\theta=15.3°\pm0.25°$ to the peak at $14.6°\pm0.25°$ is 25:1 or less.

3. The solid electrolyte material of claim 1, comprising a formula LPS·zLiX, wherein
    LPS denotes a mixture of $Li_2S$ and $P_2S_5$ having a molar ratio ranging from 1:1 to 4:1;
    LiX represents LiCl, LiBr, LiI, $LiBH_4$, $LiBF_4$, $LiNH_2$, or $LiNO_3$; and
    $0.25 \leq z \leq 4$.

4. The solid electrolyte material of claim 1, comprising a formula LPS·zLiX, wherein
    LPS denotes a mixture of $Li_2S$ and $B_2S_3$ having a molar ratio ranging from 1:1 to 3:1;
    LiX represents LiCl, LiBr, LiI, $LiBH_4$, $LiBF_4$, $LiNH_2$, or $LiNO_3$; and
    $0.25 \leq z \leq 4$.

5. The solid electrolyte material of claim 1, comprising a formula LPSX·zLiX, wherein
    LPSX denotes a mixture of $Li_2S$, $P_2S_5$, and LiX having a molar ratio ranging from 1:1:1 to 4:1:4;
    LiX represents LiCl, LiBr, LiI, $LiBH_4$, $LiBF_4$, $LiNH_2$, or $LiNO_3$; and
    $0.25 \leq z \leq 4$.

6. The solid electrolyte material of claim 1, comprising a formula LPSX·zLiX, wherein
    LPSX denotes a mixture of $Li_2S$, $B_2S_3$, and LiX having a molar ratio ranging from 1:1:1 and 3:1:4;
    LiX represents LiCl, LiBr, LiI, $LiBH_4$, $LiBF_4$, $LiNH_2$, or $LiNO_3$; and
    $0.25 \leq z \leq 4$.

7. The solid electrolyte material of claim 1, comprising a crystalline domain size of 100 nm or less.

8. The solid electrolyte material of claim 1, comprising one or more structural units comprising at least one of $P_2S_6^{4-}$ or $PS_4^{3-}$.

9. The solid electrolyte material of claim 1, comprising a crystalline fraction having a nominal composition of $Li_5PS_4X_2$ and a glassy fraction.

10. The solid electrolyte material of claim 1, comprising a formula $Li^+_{(12-n-y)}T^{n+}A^{2-}_{(6-y)}X^-_{(y)}$ wherein T comprises P, A comprises S, X comprises $BH_4$, and y>1.

11. The solid electrolyte material of claim 1, comprising a mixture of a crystalline phase having peaks at $2\theta=14.6°\pm0.25°$, $15.3°\pm0.25°$, and $25.1°\pm0.25°$ in an X-ray diffraction measurement with Cu-K$\alpha$(1,2)=1.5418 Å and of one or more of $LiBH_4$, $LiBF_4$, $LiNH_2$, $LiNO_3$, LiSCN, LiOCN.

12. The solid electrolyte material of claim 1, comprising a crystalline Argyrodite-type phase comprising 50% or more by mol of total phases present.

13. An electrochemical cell comprising:
    (a) a positive electrode layer containing a positive electrode active material;
    (b) a negative electrode layer containing a negative electrode active material; and
    (c) a solid electrolyte containing layer disposed between the positive electrode layer and the negative electrode layer, wherein at least one of the positive electrode layer, the negative electrode layer, and the solid electrolyte containing layer comprises at least one solid electrolyte material comprising: Li, T, X and A, wherein
    T comprises P, As, Si, Ge, Al, and B;
    X comprises one or more halogens, $BH_4$, $BF_4$, $NH_2$, or $NO_3$ or combination thereof;
    A comprises one or more of S, Se, and N; and
    the at least one solid electrolyte material has peaks at $2\theta=14.6°=0.25°$, $15.3°\pm0.25°$, and $25.1°\pm0.25°$ in an X-ray diffraction measurement with Cu-K$\alpha$(1,2)= 1.5418 Å,
    and wherein the solid electrolyte material has a Raman spectrum comprising a peak at 423 cm$^{-1}$ wherein the peak at 423 cm$^{-1}$ is the highest intensity peak in a range from 200-700cm$^{-1}$.

14. The electrochemical cell of claim 13, where in the negative electrode active material comprises one or more of lithium metal, lithium alloys, Si, Sn, graphitic carbon, hard carbon, or combination thereof.

15. A method for producing a solid electrolyte material comprising combining a composition comprising Li, T, and A wherein T is at least one element selected from the group consisting of P, As, Si, Ge, Al, and B; and A comprises one or more of S, Se, and N with a compound LiX to form a solid electrolyte material, wherein X comprises one or more halogens, $BH_4$, $BF_4$, $NH_2$, or $NO_3$ or combination thereof; wherein the formed solid electrolyte material has peaks at $2\theta=14.6°\pm0.25°$, $15.3°\pm0.25°$, and $25.1°\pm0.25°$ in an X-ray diffraction measurement with Cu-K$\alpha$(1,2)=1.5418Å, and wherein the solid electrolyte material has a Raman spectrum comprising a peak at 423 cm$^{-1}$, wherein the peak at 423 cm$^{-1}$ is the highest intensity peak in a range from 200-700 cm$^{-1}$.

16. The method of claim 15, wherein the combining comprises mixing, milling, or grinding until at least one of the precursor materials are substantially amorphized or alloyed.

17. The method of claim 16, wherein the composition comprises a $Li_2S:P_2S_5$ component in a glass forming ratio.

18. The method of claim 17, wherein the glass forming ratio of the $Li_2S:P_2S_5$ component ranges from 1:1 by mol to 1:4 by mol.

19. The method of claim 17, wherein the $Li_2S:P_2S_5$ component comprises one or more of a glassy phase or a crystalline phase.

20. A solid electrolyte material comprising a formula LPS · zLiX, wherein
LPS denotes a mixture of $Li_2S$ and $P_2S_5$ having a molar ratio ranging from 1:1 to 4:1;
LiX represents LiCl, LiBr, LiI, $LiBH_4$, $LiBF^4$, $LiNH_2$, or $LiNO_3$; and
$0.25 \leq z \leq 4$,
wherein the solid electrolyte material has peaks at $2\theta=14.6°+0.25°$, $15.3°+0.25°$, and $25.1°+0.25°$ in an X-ray diffraction measurement with Cu-K$\alpha$(1,2)=1.5418Å.

21. A solid electrolyte material comprising a formula LPS · zLiX, wherein LPS denotes a mixture of $Li_2S$ and $B_2S_3$ having a molar ratio ranging from 1:1 to 3:1;
LiX represents LiCl, LiBr, LiI, $LiBH_4$, $LiBF_4$, $LiNH_2$, or $LiNO_3$; and
$0.25 \leq z \leq 4$,
wherein the solid electrolyte material has peaks at $2\theta=14.6°+0.25°$, $15.3°+0.25°$, and $25.1°+0.25°$ in an X-ray diffraction measurement with Cu-K$\alpha$(1,2)=1.5418Å.

* * * * *